United States Patent [19]

Tippmann et al.

[11] Patent Number: 5,086,693
[45] Date of Patent: Feb. 11, 1992

[54] APPARATUS FOR HEATING AND COOLING FOOD ARTICLES

[76] Inventors: Vincent P. Tippmann, 8605 N. River Rd., New Haven, Ind. 46774; Joseph R. Tippmann, HRC-33, Box 8419, Rapid City, S. Dak. 57701

[21] Appl. No.: 735,178

[22] Filed: Jul. 23, 1991

Related U.S. Application Data

[63] Continuation of Ser. No. 542,600, Jun. 25, 1990, abandoned.

[51] Int. Cl.⁵ .................................................. A23L 1/00
[52] U.S. Cl. .......................................... 99/333; 99/448; 99/468; 99/470; 99/477; 165/919
[58] Field of Search ................................... 219/386, 387

[56] References Cited

U.S. PATENT DOCUMENTS 4,047,476  9/1977  Liebermann ............................ 99/330
4,210,675  7/1980  Liebermann .......................... 426/233
4,724,754  2/1988  Crozat et al. .......................... 99/483
4,903,640  2/1990  Howard ................................ 165/168

Primary Examiner—Harvey C. Hornsby
Assistant Examiner—Reginald L. Alexander
Attorney, Agent, or Firm—Joseph J. Baker

[57] ABSTRACT

An apparatus is disclosed for heating or cooling food articles including a chamber containing a plurality of vertically spaced-apart supports for food articles, each support has a plurality of spaced apart tubular members connected to first and second plenums. Supply and return headers are connected respectively to each first and second plenum of each support and by conduit to a fluid reservoir and pump to circulate a fluid in a closed loop fluid transfer circuit through each support. A heating and cooling apparatus for the fluid is also provided and controls for controlling operation of the heating and cooling apparatus individually or in a predetermined sequence and at a preselected temperature are also included.

10 Claims, 3 Drawing Sheets

APPARATUS FOR HEATING AND COOLING FOOD ARTICLES

This application is a continuation of U.S. Pat. Ser. No. 07/542,600 filed June 25, 1990, now abandoned.

BACKGROUND OF THE INVENTION

This invention relates to an apparatus for transferring heat to food articles and, more particularly, to a novel apparatus particularly adapted for holding previously cooked food articles quite near to a preferred temperature for prolonged time periods, and which can also be employed to initially cook food articles or to complete the cooking of food articles that have been previously partially cooked. In addition, the apparatus can also cool the previously cooked or partially cooked food articles or freeze them.

The novel method of cooking and holding food articles for which the present apparatus is utilized is disclosed in U.S. Pat. Nos. 4,210,675, 4,224,862 and 4,278,697 the contents of which are to be incorporated herein by reference in their entirety.

Briefly, the U.S. Department of Agriculture has long determined that there is considerable danger of spoilage and salmonella (food poisoning bacteria) development in food articles which are held for even short periods of time at temperatures ranging between 40° F. and 145° F. Prior art apparatus utilizing, for example, electrically heated air, steam, etc. have encountered problems in attempting to maintain warm food articles held in the apparatus at temperatures above 140° F. within a temperature range of +5° F. without also causing considerable undesired additional cooking or "overcooking" of them as pointed out in the aforementioned patents. The method comprises storing cooked meat or other food articles in a chamber having closure means intended to be repeatedly and frequently opened and closed, supporting the cooked food articles on support means located within the chamber, forcing a heated liquid heat-transferring medium through radiator means located adjacent to and on opposite sides of the support means, and maintaining the humidity within the chamber above that of the atmosphere outside of the chamber and the temperature above 140° F. and within a temperature range of +5° F. The apparatus disclosed in the aforementioned patents for practicing the aforestated method consisted basically of mounting a plurality of support means in vertical stacked relationship to each other. Each of the support means consists of a plate to which is secured a serpentine coil for transferring the heated fluid. The coils of each support means are connected in series relationship to the pump and the sump containing the heated liquid. The aforedescribed support means it has been discovered is both inefficient and expensive to manufacture. The serial connection of all of the plates with their serpentine coils results in an unacceptably high pressure loss of fluid flowing through the coil and the necessity of using a larger pump. In addition, inefficient heat transfer and poor heat distribution resulted from the prior art design and coil connection. Further, placing the sump and pump on the bottom of the heating chamber inhibits air removal from the circulated fluid. The problems associated with the prior art apparatus are eliminated in the present invention by placing the sump and pump above the vertical stack of the food support means and connecting them substantially in parallel by the use of a unique header system. The support means themselves are also novel and considerably more efficient than those of the prior art. They consist of a plurality of spaced-apart tubular members each having one end thereof connected to a first plenum and the other end connected to a second plenum. The spacing between the tubular members permits visual inspection through the supports for the presence of food product left beneath the supports. The plenums are connected to a header system which serves to reduce the pressure drop across all of the supports enabling the use of a smaller pump and drive motor for the circulated fluid. In addition, to ensure even heat distribution over the entire surface of each support, small orifices are positioned at the entrance to each tubular member to even out the fluid flow through all of the tubular members of each support and prevent the tendency of the fluid velocity to be higher through the extreme tubular members than through those in the middle of the support means.

It is therefore the primary object of the present invention to provide a superior apparatus for thawing, cooking, holding and cooling food articles.

It is another object of the present invention to provide a novel support for pans containing the food articles which more efficiently transfer the heat or cold from the support to the pan resulting in a more even distribution of the heat or cold over the entire surface of the pan.

It is yet another object of the present invention to provide a novel header system for interconnecting a group of vertically stacked pan supports which insures an even supply of heating or cooling fluid for each pan support and permits their easy removal for cleaning or replacement.

Other objects and advantages of the present invention will become apparent and obvious from a study of the following description and accompanying drawings, which are merely illustrative of the present invention.

DETAILED DESCRIPTION OF THE INVENTION

Figure 2:
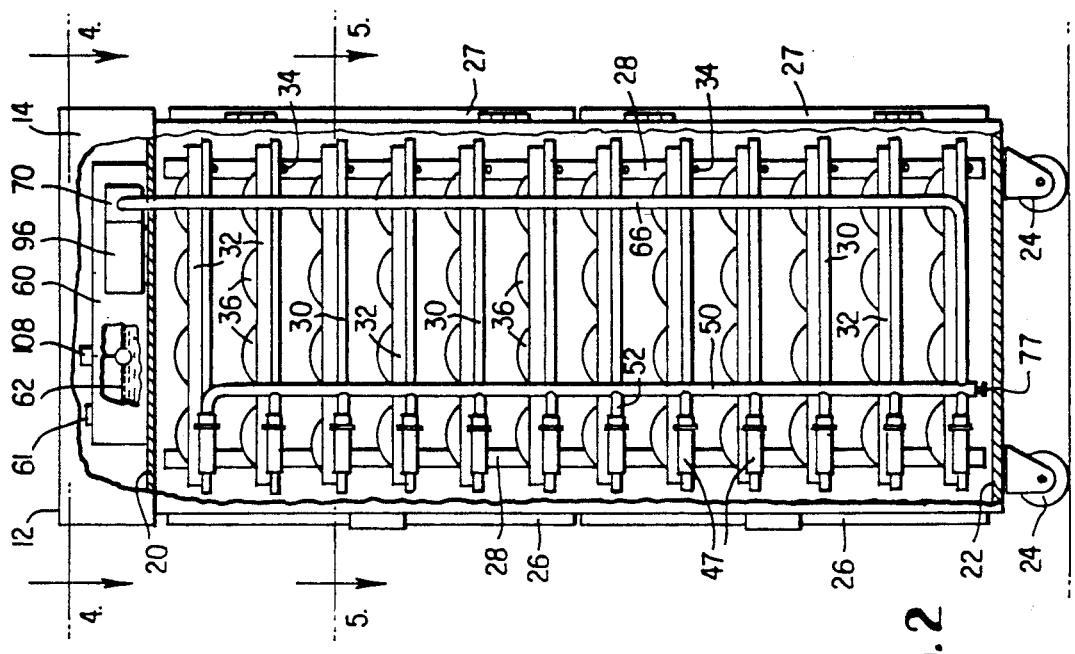
FIG. 2 is a side elevational view with partial cutaway of the apparatus of FIG. 1.

Referring now to the drawings where like characters of reference indicate like elements in each of the several views, numeral 10 refers generally to the apparatus of the present invention for thawing, cooking, holding and cooling various types of food articles.

Figure 1:
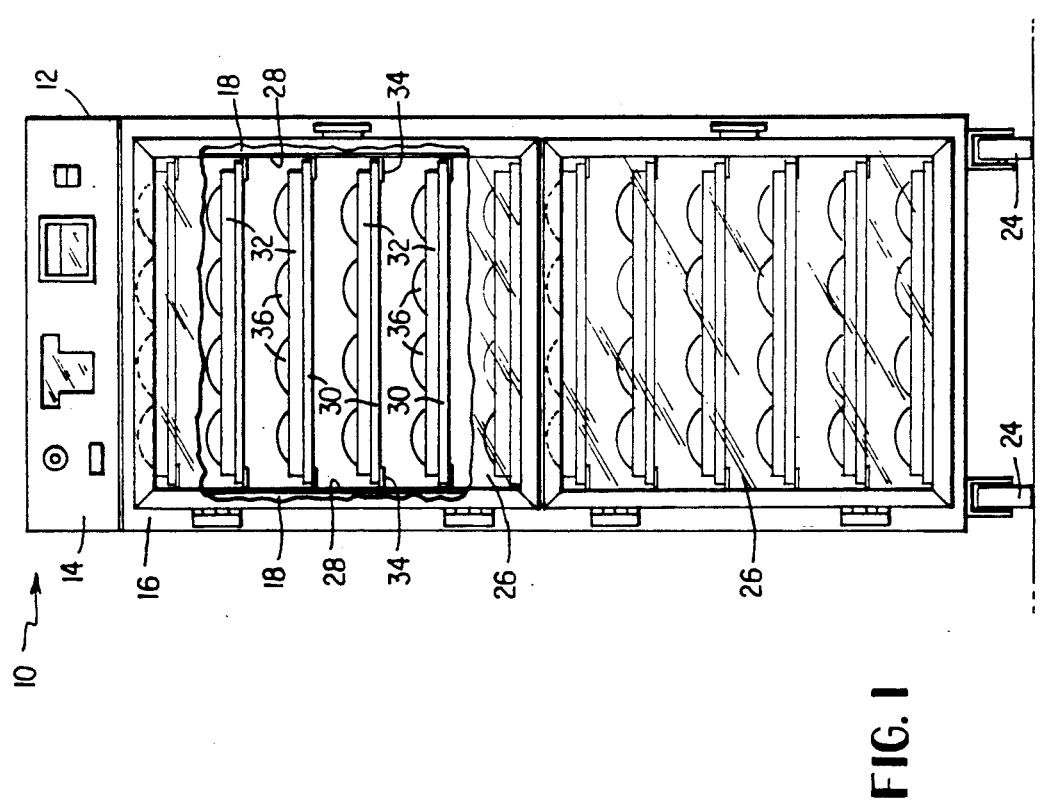
FIG. 1 is a front elevational view with partial cutaway of the thawing, cooking, holding and cooling apparatus for food articles of the present invention.

The apparatus 10 shown in FIGS. 1 and 2 comprises a cabinet member 12 having an upper chamber 14 containing electrical controls and parts of the closed-loop fluid transfer system and a lower chamber 16 for holding the food articles. The lower chamber 16 has a pair of vertically upstanding side walls 18, a top wall 20 and a bottom wall 22 to which is attached wheels 24. The front and back of the lower chamber 16 is open and, in one embodiment, closures are provided in the form of thermopane doors 26 and 27 on both the front and back of the lower chamber 16, respectively, to permit food articles to be loaded on one side and removed from the other. Vertical mounting strips 28 are secured to the upstanding side walls 18 for holding a plurality of vertically stacked supports 30 for pans 32 by means of extending tabs 34. The pans 32 contain the food articles 36 and slidably extend to a point substantially adjacent the upstanding side walls 18 and the front and back doors 26. As aforementioned the pans 32 can be loaded on the supports 30 through, for example, the rear door 27 and after the desired cooking or holding time removed through the front door 26.

Figure 3:
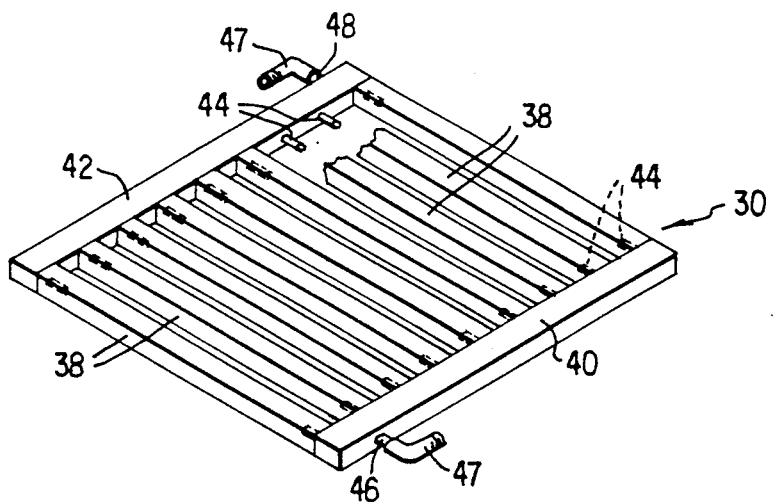
FIG. 3 is a perspective view of one of the pan supports of the present invention.

Referring now to FIG. 3, the support 30 is shown consisting of a plurality of spaced-apart tubular members 38. Each of the tubular members 38 has one end thereof connected in fluid tight relationship to a first plenum 40 and the other end thereof connected similarly to a second plenum 42. Preferably the tubular members 38 and plenums 40 and 42 are rectangular in shape and present a flat surface on which the pan 32 rests thereby insuring maximum and even heat conduction therebetween. At least one of the plenums 40 and 42 has a plurality of projecting orifices 44 each of which extends into one of the tubular members 38 to regulate and control the flow of heating or cooling medium therethrough to and from the plenums 40 & 42 to thereby equilibrate the medium distribution. The orifices 44 serve to prevent the rush of fluid through the tubular members most distant from the inlet to the first plenum which would occur without the orifices 44 causing one end of the support 30 to be warmer than the other with resulting uneven cooking or cooling of the food article 32. The first plenum 40 has an inlet 46 for receiving the heated or cooled fluid and the second plenum 42 has an outlet 48 for discharging the fluid after it has passed through the tubular members 38.

Each inlet 46 of each first plenum 40 of each support 30 is connected by flexible tubing 47, for example, to a header supply pipe 50 having a plurality of spaced-apart take off pipes 52. Similarly, each outlet 48 from each second plenum 42 of each support 30 is connected by flexible tubing 47, for example, to a header return pipe 54, also having a plurality of spaced-apart take off pipes 56. It being understood of course that other methods such as pipe couplings and the like could be used in place of flexible tubing 47.

Figure 4:
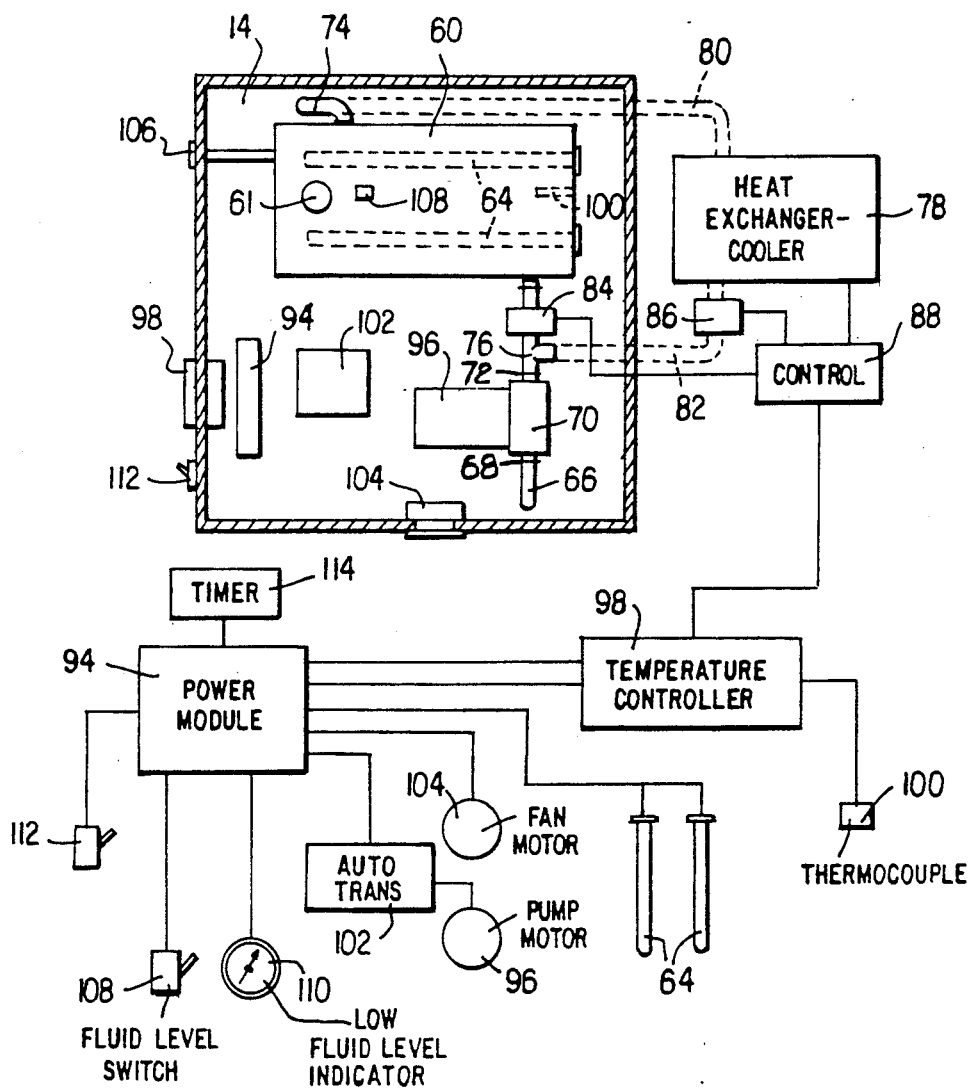
FIG. 4 is a plan view taken along the lines 4—4 of FIG. 2 and a block diagram of the electrical circuit of the apparatus of the present invention.
Figure 5:
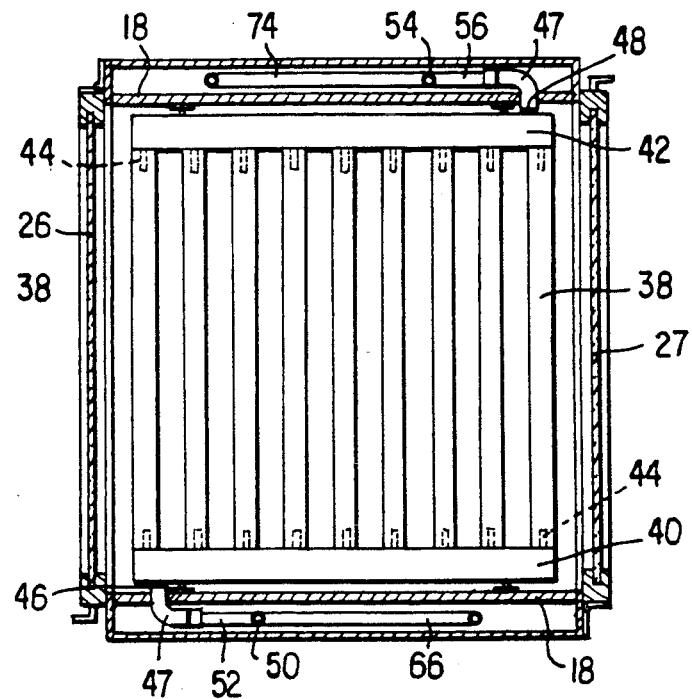
FIG. 5 is a cross-sectional view taken along the lines 5—5 of FIG. 2 of one of the pan supports of the present invention and its interconnection.

Referring now to FIG. 4, the upper chamber 14 contains a reservoir 60 having a fill cap 61 for holding a supply of transfer fluid 62 which can be heated by electrical heating elements 64 extending into the reservoir. The fluid 62 is normally plain water or a mixture of water and glychol. The transfer fluid 62 can also be heated by a gas burner (not shown) or steam if desired. The header supply pipe 50 is connected to supply line 66 which in turn is connected to the discharge outlet 68 of a pump 70. The inlet side 72 of the pump 70 is also connected to the reservoir 60 and the header return pipe 54 is connected by return line 74 also to the reservoir 60 to thereby complete a closed loop fluid transfer system wherein none of the transfer fluid 62 is exposed either within the upper or lower chambers 14 and 16. Thus, the pump 70 withdraws heated fluid from the reservoir 60 through pipe 76 and forces it into first plenum 40 via supply line 66, header supply pipe 50, through the projecting orifices 44 and tubular members 38, through second plenum 42, header return pipe 54, return line 74 and back to the reservoir 60. The supply line 66 is connected to header supply pipe 50 at the lower end thereof and the return line 74 is connected to header return pipe 54 at the upper end thereof to thereby permit any trapped air in the system to eventually make its way back to reservoir 60 and be discharged therefrom. A drain plug 77 is also provided at the bottom of the headers 59 and 54.

In addition, a heat exchanger-cooler 78 can also be provided connected to return line 74 by conduit 80 and to the inlet side 72 of pump 70 by conduit 82. The heat exchanger-cooler 78 can be employed to cool the supports 30 rapidly by closing valve 84 and permitting all of the transfer fluid to pass through the heat exchanger 78 where it is cooled or if it is desired to gradually either cool the heated transfer fluid or heat the already cooled transfer fluid, valves 84 and 86 can be partially opened to permit a mix of heated and cooled fluid to enter the pump 70 by means of control 88.

Figure 6:
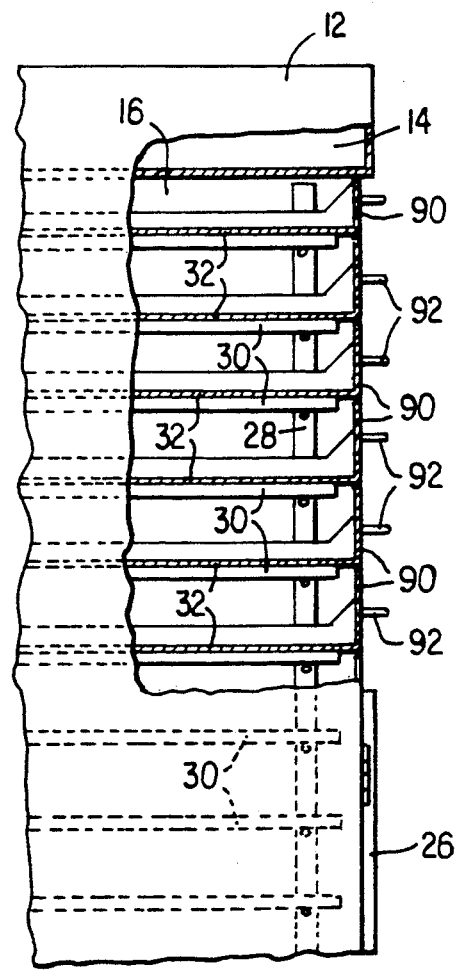
FIG. 6 is a partial elevational view in partial cutaway of the apparatus of the present invention.

Referring to FIG. 6, the thermopane doors 26 and 27 can be totally or partially eliminated and the exposed area between the supports 30 closed by means of a vertically extending lip or front 90 attached to the edge of the pan 32 containing the food articles. As the pans 32 are slid into position, the fronts 90 close off the space between the supports 30 and present a vertically extending, substantially planer front surface. Handles 92 can be provided on each front and the fronts themselves made of opaque material so that the contents of the pans can be viewed from the outside.

An electrical control circuit is shown in FIG. 7 in block diagram form and includes a module 94 for controlling the electrical power to the heating elements 64, the motor 96 of the pump 70 in response to temperature set on temperature controller 98 and the temperature sensed by thermocouple 100 of the transfer fluid 62 in reservoir 60. The temperature controller 98 also controls controller 88 which in turn energizes heat exchanger-cooler 78 and valves 84 and 86 depending on the extend of cooling of the transfer fluid 62 desired. An auto-transformer 102 is also provided to reduce the line voltage, usually 220 volts, to 110 volts to energize the pump motor 96 and a small fan 104 is installed on the wall of the upper chamber 14 to circulate cooling air therethrough. In order to visually inspect the level of the transfer fluid 62 in the reservoir 60, a cite-glass 106 is provided extending into the reservoir 60 and a fluid level float-type switch 108 is also positioned in the reservoir to energize a warning light in the form of a low fluid level indicator 110 if the transfer fluid 62 falls below a predetermined level to thereby prevent damage to the heater elements 64. A switch 112 connects the power module 94 to a source of electrical current. In operation, the temperature controller 98 is set at a preferred temperature which is the temperature the operator wants to achieve and/or maintain at the center of the food article 36. When the apparatus 10 is employed to initially cook food articles or to complete the cooking of food articles that have been previously partially cooked, this preferred temperature is the so-called "doneness temperature" of the food article 36, e.g. for chicken parts this "doneness temperature" is 165° F.; for beef parts, this "doneness temperature" ranges from 130° F. to 145° F. However, it should be understood that it is often preferred to hold food articles which have been previously fully cooked at a "holding temperature" that is lower than their "doneness temperature". With chicken parts, for example, the "holding temperature" is 150° F or 36° F. below the "doneness temperature of 165° F. Thus, after the temperature controller 98 is set at the desired preferred temperature, the heaters 64 are energized and the transfer fluid 62 is heated and circulated by pump 70 through the supports 30 into the food article 36 on pans 32. A timer 114 can also be provided to cause the power module 94 to reduce the preferred temperature of the transfer fluid 62 to a lower amount after the food article 32 has reached the "doneness temperature" and it is then desired to "hold" the article at a lower temperature for a period of time. The timer 114 can also be employed to energize the heat exchanger/cooler 78 to gradually cool the held article to prevent its spoilage. In addition, the timer 114 may be used to energize the power module 94 in the morning to begin warming the transfer fluid 62 to thaw frozen food articles 32, bring them up to "doneness temperature" and after a period of time reduce them to "holding temperature" for serving or further processing in a browning oven.

Applicants have thus described in detail their apparatus for heating and cooling food articles which employs the novel pan support concept and novel header system for connecting the plurality of supports in a closed loop, fluid transfer system.

It is apparent that many modifications and variations of this invention as hereinbefore set forth may be made without departing from the spirit and scope thereof. The specific embodiments described are given by way of example only and the invention is limited only by the terms of the appended claims.

We claim:

1. An apparatus for transferring heat to food articles container within a chamber comprising:
  a) a chamber having at least two vertically upstanding, spaced-apart side walls and adjacent top and bottom walls, and at least one closure member permitting access to said chamber;
  b) a plurality of pans for holding said food articles within said chamber;
  c) a plurality of vertically spaced-apart support means between said walls, each of said support means being made of heat conductive material and supporting one of said pans, said support means including a plurality of spaced-apart tubular members, each tubular member having one end thereof connected to a first plenum and the other end thereof connected to a second plenum, said first and second plenums and each of said tubular members engaging said respective pan in heat conductive relationship;
  d) supply header means connecting said first plenums of each of said support means and return header means connecting said second plenums of each of said support means;
  e) means for circulating a heated transfer fluid through said supply and return header means and said support means; and
  f) means projecting into each of said tubular members from at least one of said first or second plenums, said means having an orifice sized to equilibrate the flow of said transfer fluid through said tubular members of each of said support means to ensure even heating of said food articles on each said pans.

2. Apparatus as set forth in claim 1 wherein said circulating means comprises:
  a) reservoir means for holding a quantity of transfer fluid;
  b) fluid pump means;
  c) conduit means fluid-connecting said reservoir, said supply and return header means and said pump means to form a closed-loop fluid transfer means;
  d) means for heating said fluid in said reservoir means; and
  e) control means connected to said heating means for controlling the desired temperature to which the fluid is to be heated and maintained by said heating means.

3. Apparatus as set forth in claim 1 wherein said fluid is water.

4. Apparatus as set forth in claim 1 wherein said fluid is a mixture of water and glycol.

5. Apparatus as set forth in claim 2 wherein said pump and said reservoir are located on top of said chamber and said fluid flows in at the lower end of said supply header means and out the upper end of the return header means to thereby ensure that air trapped in said fluid can rise through said supply and return header means and said support means and be discharged.

6. Apparatus as set forth in claim 2 further comprising fluid level activated switch means for shutting off said heating means if said fluid in said reservoir falls below a predetermined level.

7. Apparatus as set forth in claim 1 further comprising:
  a) heat exchange means connected to said supply and return header means for cooling said transfer fluid; and
  b) control means for controlling the passage of said transfer fluid through said heat exchange means.

8. Apparatus as set forth in claim 1 wherein said chamber has front and back closure means to permit said food articles to be loaded on said support means from either side of said chamber.

9. Apparatus as set forth in claim 8 wherein said front closure means comprises an upstanding lip across one end of each of said pans for closing the opening between adjacent vertically spaced-apart support means when said pans are fully inserted in said chamber.

10. An apparatus for transferring heat to food articles contained within a chamber comprising:
  a) a chamber having at least two vertically upstanding, spaced apart side walls and adjacent top and bottom walls, and at least one closure member permitting access to said chamber;
  b) a plurality of pans for holding said food articles within said chamber;
  c) a plurality of vertically spaced-apart support means between said walls, each of said support means being made of heat conductive material and supporting one of said pans, said support means including a plurality of spaced-apart tubular members, each tubular member having one end thereof connected to a first plenum and the other end thereof connected to a second plenum, said first and second plenums and each of said tubular members engaging said respective pan in heat conductive relationship;
  d) supply header means connecting said first plenums of each of said support means and terminating at an inlet near the bottom of said chamber and return header means connecting said second plenums of each of said support means and terminating at an outlet near the top of said chamber to thereby ensure that air trapped in said fluid can rise through said supply and return header means and said support means and be discharged;

e) fluid pump means having an inlet and an outlet;

f) reservoir means on the top of said chamber for holding a quantity of heat transfer fluid, said reservoir means being connected to said inlet of said fluid pump means;

g) conduit means connecting said outlet of said pump to said header means to said reservoir and said outlet of said pump to said inlet of said supply header means to form a closed-loop fluid transfer means;

h) means for heating said fluid in said reservoir means;

i) control means connected to said heating means for controlling the desired temperature to which the fluid is to be heated and maintained by said heating means; and j) means projecting into each of said tubular members from at least one of said first or second plenums, said means having an orifice sized to equilibrate the flow of said transfer fluid through said tubular members of each of said support means to ensure even heating of said food articles on each of said pans.

* * * * *